(12) United States Patent
Christmas

(10) Patent No.: US 11,810,488 B2
(45) Date of Patent: Nov. 7, 2023

(54) HOLOGRAM DISPLAY USING A LIQUID CRYSTAL DISPLAY DEVICE

(71) Applicant: Dualitas Ltd, Milton Keynes (GB)

(72) Inventor: Jamieson Christmas, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

(21) Appl. No.: 16/995,460

(22) Filed: Aug. 17, 2020

(65) Prior Publication Data
US 2021/0096512 A1 Apr. 1, 2021

(30) Foreign Application Priority Data
Sep. 27, 2019 (GB) ..................................... 1913947

(51) Int. Cl.
*G09G 3/00* (2006.01)
*G09G 3/36* (2006.01)
(Continued)

(52) U.S. Cl.
CPC ........... *G09G 3/003* (2013.01); *G09G 3/2022* (2013.01); *G09G 3/3614* (2013.01);
(Continued)

(58) Field of Classification Search
CPC .... G09G 3/003; G09G 3/2022; G09G 3/3614; G09G 3/3648; G09G 2300/0478;
(Continued)

(56) References Cited

U.S. PATENT DOCUMENTS 5,812,225 A * 9/1998 de Lauzun ........... G02B 6/0031
 349/67
5,973,817 A * 10/1999 Robinson ................ G02F 1/292
 359/254
(Continued)

FOREIGN PATENT DOCUMENTS

EP 3408711 B1 12/2018
GB 2444990 A 6/2008
(Continued)

OTHER PUBLICATIONS

Combined Search and Examination Report under Section 17 & 18(3) for Great Britain Application No. GB1913947.6 dated Mar. 30, 2020, pp. 1-5.
(Continued)

*Primary Examiner* — Michael J Jansen, II
(74) *Attorney, Agent, or Firm* — McDonnell Boehnen Hulbert & Berghoff LLP

(57) ABSTRACT

A method of driving a display device. The display device comprises a liquid crystal panel, a display engine and a hologram engine. The liquid crystal display panel comprising a plurality of pixels. The display device comprises a display engine arrange to drive each pixel of the plurality of pixels during each display interval of a plurality of display intervals defined by the display device. Each pixel is driven in accordance with a drive signal. The drive signal may comprise a pixel voltage for each pixel. The display engine is arranged to invert the polarity of the drive signal every display interval. The hologram engine is arranged to send multi-level phase holograms for display to the display engine. The method comprises displaying the multi-level phase holograms in immediately consecutive display intervals without field inversion.

11 Claims, 11 Drawing Sheets

(51) Int. Cl.
 *G09G 3/20* (2006.01)
 *G03H 1/00* (2006.01)
(52) U.S. Cl.
 CPC ......... *G09G 3/3648* (2013.01); *G03H 1/0005* (2013.01); *G03H 2001/0088* (2013.01); *G09G 2300/0478* (2013.01); *G09G 2320/0204* (2013.01)
(58) Field of Classification Search
 CPC ... G09G 2320/0204; G09G 2300/0469; G09G 3/3611; G03H 1/0005; G03H 2001/0088
 See application file for complete search history.

(56) References Cited

U.S. PATENT DOCUMENTS

| | | | | |
|---|---|---|---|---|
| 5,990,991 | A * | 11/1999 | Tillin | G02F 1/13473 349/33 |
| 6,961,045 | B2 * | 11/2005 | Tsao | G02B 30/50 348/E5.142 |
| 7,038,641 | B2 * | 5/2006 | Hirota | G09G 3/20 345/212 |
| 7,400,377 | B2 * | 7/2008 | Evans | H04N 13/359 349/194 |
| 8,031,382 | B2 * | 10/2011 | Johnson | G03H 1/0841 359/9 |
| 8,085,452 | B2 * | 12/2011 | Stanley | G02F 1/135 359/9 |
| 8,154,781 | B2 * | 4/2012 | Kroll | G03H 1/02 359/9 |
| 8,259,093 | B2 * | 9/2012 | Sakashita | H04N 9/312 345/204 |
| 8,411,339 | B2 * | 4/2013 | Stanley | G03H 1/02 359/9 |
| 8,487,919 | B2 * | 7/2013 | Kobayashi | G09G 3/3614 345/204 |
| 8,773,479 | B2 * | 7/2014 | Nishimori | G09G 3/3614 345/691 |
| 8,884,946 | B2 * | 11/2014 | Niioka | G02B 30/30 345/418 |
| 9,268,211 | B2 * | 2/2016 | Van Eijk | G03F 7/704 |
| 9,715,215 | B2 * | 7/2017 | Christmas | G03H 1/2294 |
| 9,857,771 | B2 * | 1/2018 | Christmas | G03H 1/0808 |
| 9,904,251 | B2 * | 2/2018 | Byun | G03H 1/2294 |
| 10,102,814 | B2 * | 10/2018 | Missbach | G09G 3/3614 |
| 10,228,559 | B2 * | 3/2019 | Christmas | G03H 1/2294 |
| 10,228,654 | B2 * | 3/2019 | Christmas | B60Q 1/085 |
| 10,310,261 | B2 * | 6/2019 | Christmas | G02B 27/0103 |
| 10,481,554 | B2 * | 11/2019 | Christmas | G03H 1/2294 |
| 10,514,658 | B2 * | 12/2019 | Christmas | G03H 1/2205 |
| 10,585,396 | B2 * | 3/2020 | Christmas | G03H 1/2294 |
| 10,802,440 | B2 * | 10/2020 | Mullins | B33Y 10/00 |
| 10,847,068 | B2 * | 11/2020 | Christmas | G03H 1/08 |
| 10,859,821 | B2 * | 12/2020 | Christmas | G02B 27/0101 |
| 10,871,746 | B2 * | 12/2020 | Christmas | G03H 1/2286 |
| 10,976,703 | B2 * | 4/2021 | Mullins | B29C 64/227 |
| 10,983,423 | B2 * | 4/2021 | Sakai | G02B 27/0101 |
| 11,231,583 | B2 * | 1/2022 | Christmas | G02B 5/30 |
| 11,231,683 | B2 * | 1/2022 | Wengierow | G03H 1/30 |
| 11,232,729 | B2 * | 1/2022 | Fattal | G09G 3/342 |
| 11,243,495 | B2 * | 2/2022 | Christmas | G03H 1/0808 |
| 11,256,215 | B2 * | 2/2022 | Cole | G03H 1/26 |
| 11,275,339 | B2 * | 3/2022 | Collings | G03H 1/16 |
| 11,275,340 | B2 * | 3/2022 | Christmas | G03H 1/2286 |
| 11,281,003 | B2 * | 3/2022 | Mullins | G02B 27/0955 |
| 11,307,534 | B2 * | 4/2022 | Christmas | G03H 1/2205 |
| 11,372,287 | B2 * | 6/2022 | Collings | G02F 1/136277 |
| 11,409,242 | B2 * | 8/2022 | Christmas | G02B 27/0176 |
| 11,454,929 | B2 * | 9/2022 | Collings | G09G 3/2085 |
| 11,480,855 | B2 * | 10/2022 | Sakai | G02B 27/0101 |
| 11,480,919 | B2 * | 10/2022 | Wengierow | G03H 1/0808 |
| 11,493,881 | B2 * | 11/2022 | Christmas | G03H 1/2294 |
| 11,500,331 | B2 * | 11/2022 | Wengierow | G02B 27/0103 |
| 11,500,332 | B2 * | 11/2022 | Christmas | G02B 27/0103 |
| 11,531,200 | B2 * | 12/2022 | Collin | H04N 9/312 |
| 11,586,144 | B2 * | 2/2023 | Mullins | B29C 64/277 |
| 11,635,621 | B2 * | 4/2023 | Christmas | G03H 1/2294 359/9 |
| 11,640,138 | B2 * | 5/2023 | Christmas | G03H 1/02 359/27 |
| 11,644,793 | B2 * | 5/2023 | Gomes | G02B 7/003 359/28 |
| 11,681,257 | B2 * | 6/2023 | Christmas | G03H 1/2294 359/15 |
| 2002/0190922 | A1 * | 12/2002 | Tsao | G02B 30/50 348/E5.142 |
| 2004/0140972 | A1 * | 7/2004 | Hirota | G09G 3/3225 345/204 |
| 2004/0189575 | A1 | 9/2004 | Choi et al. | |
| 2006/0126156 | A1 * | 6/2006 | Evans | G02F 1/13363 359/320 |
| 2008/0278780 | A1 * | 11/2008 | Stanley | G09G 3/003 359/9 |
| 2009/0073192 | A1 | 3/2009 | Kobayashi | |
| 2009/0128619 | A1 | 5/2009 | Mash | |
| 2009/0322738 | A1 * | 12/2009 | Cable | G03H 1/0808 345/419 |
| 2010/0026678 | A1 | 2/2010 | Sakashita | |
| 2010/0027083 | A1 * | 2/2010 | Kroll | G03H 1/02 359/9 |
| 2010/0172001 | A1 * | 7/2010 | Johnson | G03H 1/08 359/9 |
| 2012/0069412 | A1 | 3/2012 | Stanley | |
| 2012/0182406 | A1 | 7/2012 | Woo | |
| 2012/0268481 | A1 * | 10/2012 | Niioka | G02B 30/27 345/619 |
| 2013/0069993 | A1 | 3/2013 | Nishimori et al. | |
| 2013/0265622 | A1 | 10/2013 | Christmas et al. | |
| 2014/0022526 | A1 | 1/2014 | Van Eijk et al. | |
| 2014/0240301 | A1 | 8/2014 | Yamakawa | |
| 2014/0253987 | A1 | 9/2014 | Christmas | |
| 2015/0279293 | A1 | 10/2015 | Missbach et al. | |
| 2016/0209808 | A1 | 7/2016 | Byun et al. | |
| 2017/0082855 | A1 | 3/2017 | Christmas et al. | |
| 2017/0115627 | A1 | 4/2017 | Christmas et al. | |
| 2017/0363869 | A1 | 12/2017 | Christmas et al. | |
| 2018/0046138 | A1 | 2/2018 | Christmas et al. | |
| 2018/0120768 | A1 | 5/2018 | Christmas | |
| 2018/0188532 | A1 | 7/2018 | Christmas et al. | |
| 2018/0188684 | A1 * | 7/2018 | Mullins | G03H 1/0005 |
| 2018/0203414 | A1 * | 7/2018 | Christmas | G03H 1/2294 |
| 2019/0004476 | A1 * | 1/2019 | Mullins | B29C 64/386 |
| 2019/0025583 | A1 * | 1/2019 | Mullins | G03H 1/2202 |
| 2019/0025757 | A1 * | 1/2019 | Mullins | G02F 1/13306 |
| 2019/0041641 | A1 | 2/2019 | Christmas et al. | |
| 2019/0041797 | A1 * | 2/2019 | Christmas | G03H 1/2202 |
| 2019/0064738 | A1 | 2/2019 | Cole et al. | |
| 2019/0265582 | A1 * | 8/2019 | Sakai | G03B 21/28 |
| 2019/0295449 | A1 * | 9/2019 | Christmas | G09G 3/20 |
| 2019/0361396 | A1 | 11/2019 | Christmas | |
| 2020/0033803 | A1 * | 1/2020 | Christmas | G03H 1/2205 |
| 2020/0041957 | A1 * | 2/2020 | Mullins | G03H 1/0476 |
| 2020/0050147 | A1 * | 2/2020 | Christmas | G03H 1/2205 |
| 2020/0150589 | A1 * | 5/2020 | Wengierow | G03H 1/12 |
| 2020/0150590 | A1 * | 5/2020 | Christmas | G03H 1/0808 |
| 2020/0159102 | A1 | 5/2020 | Kouyama et al. | |
| 2020/0166890 | A1 * | 5/2020 | Collings | G03H 1/0866 |
| 2020/0201253 | A1 * | 6/2020 | Christmas | G03H 1/0443 |
| 2020/0241473 | A1 * | 7/2020 | Cooney | G03H 1/0406 |
| 2020/0292990 | A1 * | 9/2020 | Christmas | G03H 1/2294 |
| 2020/0301143 | A1 * | 9/2020 | Christmas | G03H 1/32 |
| 2020/0326464 | A1 * | 10/2020 | Gomes | G02B 7/003 |
| 2021/0041834 | A1 * | 2/2021 | Christmas | G02B 27/1006 |
| 2021/0055691 | A1 * | 2/2021 | Wengierow | G03H 1/26 |
| 2021/0084270 | A1 * | 3/2021 | Christmas | G03H 1/0808 |
| 2021/0088970 | A1 * | 3/2021 | Wengierow | G03H 1/2645 |
| 2021/0096512 | A1 * | 4/2021 | Christmas | G09G 3/3611 |
| 2021/0103248 | A1 * | 4/2021 | Christmas | G09G 3/003 |
| 2021/0141221 | A1 * | 5/2021 | Collin | G03H 1/02 |
| 2021/0173341 | A1 * | 6/2021 | Collings | G09G 3/36 |
| 2021/0195146 | A1 * | 6/2021 | Christmas | G03H 1/2249 |
| 2021/0209980 | A1 * | 7/2021 | Fattal | H04N 13/351 |

(56) References Cited

U.S. PATENT DOCUMENTS

| | | | | |
|---|---|---|---|---|
| 2021/0216038 A1* | 7/2021 | Mullins | ................ | B29C 64/273 |
| 2021/0216041 A1* | 7/2021 | Christmas | ................ | G03H 1/08 |
| 2021/0232005 A1* | 7/2021 | Collings | ................ | G03H 1/02 |
| 2021/0232028 A1* | 7/2021 | Sakai | ................ | G03B 21/142 |
| 2021/0302911 A1* | 9/2021 | Christmas | ............ | G03H 1/2294 |
| 2021/0341879 A1* | 11/2021 | Christmas | ............ | G03H 1/0891 |
| 2021/0373332 A1* | 12/2021 | Collin | ................ | H04N 9/312 |
| 2021/0400169 A1* | 12/2021 | Collin | ................ | G03H 1/2294 |

FOREIGN PATENT DOCUMENTS

| | | |
|---|---|---|
| GB | 2496108 A | 5/2013 |
| GB | 2526275 A | 11/2015 |
| GB | 2552851 A | 2/2018 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | 2008-506975 A | 3/2008 |
| JP | 2008-544306 A | 12/2008 |
| JP | 2009-042481 A | 2/2009 |
| JP | 2010-34883 A | 2/2010 |
| JP | 2011-508911 A | 3/2011 |
| JP | 2015-509208 A | 3/2015 |
| KR | 2004-0085495 A | 10/2004 |
| WO | 2006/003609 A1 | 1/2006 |
| WO | 2006134398 A2 | 12/2006 |
| WO | 2009/087358 A1 | 7/2009 |
| WO | 2010125367 A1 | 11/2010 |
| WO | 2013/153354 A1 | 10/2013 |
| WO | 2018/078366 A1 | 5/2018 |
| WO | 2018078366 A1 | 5/2018 |
| WO | 2018100394 A1 | 6/2018 |
| WO | 2018100397 A1 | 6/2018 |
| WO | 2019224052 A | 11/2019 |

OTHER PUBLICATIONS

Chapters 2 and 5 From Introduction to Microdisplays, D. Armitage, I. Underwood and S-T. Wu, © 2006 John Wiley & Sons, Ltd. ISBN: 978-0-470-85281-1 (2006).

* cited by examiner

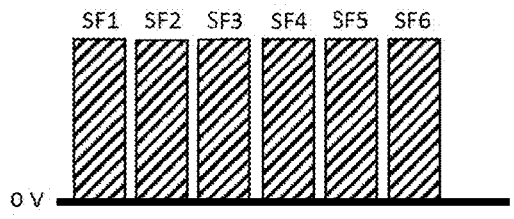
FIGURE 8A
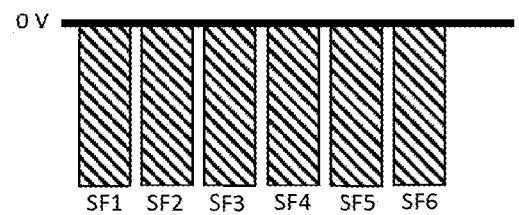
FIGURE 8B
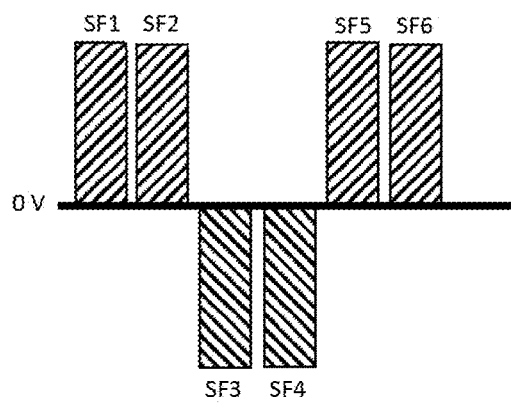
FIGURE 8C
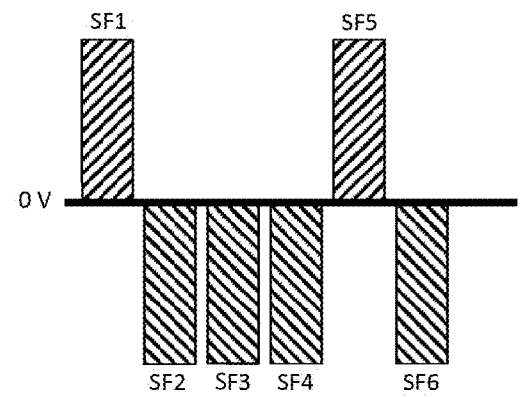
FIGUE 8D

HOLOGRAM DISPLAY USING A LIQUID CRYSTAL DISPLAY DEVICE

CROSS-REFERENCE TO RELATED APPLICATIONS

This application claims the benefit of priority of U.K. Patent Application no. 1913947.6, filed Sep. 27, 2019, which is hereby incorporated herein by reference in its entirety.

FIELD

The present disclosure relates to holography and displaying holograms. More specifically, the present disclosure relates to a display device and a method of driving a display device for holography. Some embodiments relate to a liquid crystal display device including a nematic liquid crystal display device, and a driver for the same. Other embodiments relate to a liquid crystal spatial light modulator such as a liquid crystal on silicon spatial light modulator, and a drive scheme for the same.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

Liquid crystals are extensity used for direct view displays, projection displays and photonics devices. Liquid crystal stability is a primary concern and liquid crystal display devices are required to have a long operational life. However, the presence of unbalanced fields across a liquid crystal display device tends to polarise the medium. A net electric field in one direction causes ionic build up. This build-up of ionic charges tends to interfere with the applied electric field and degrade the performance of the display device. It is known in the art to DC balance a liquid crystal display device by continually reversing the electric field. This process may be referred to as field inversion. However, there are negative consequences of field inversion. The present disclosure addresses some of these issues.

SUMMARY

Aspects of the present disclosure are defined in the appended independent claims.

There is disclosed herein a display device comprising a liquid crystal display panel, a display engine and a hologram engine. The liquid crystal display panel comprises a plurality of pixels. The display engine is arranged to drive each pixel of the plurality of pixels during each display event of a plurality of display intervals. The plurality of display intervals is defined by the display engine. Each pixel is driven in accordance with a drive signal. The display engine is arranged to invert the polarity of the drive signal every n display intervals (in order to achieve DC balancing). The display driver may be arranged to invert the polarity of the drive signal every display interval. Alternatively, the display engine may be arranged to invert the polarity of the drive signal every second or every third display interval. The hologram engine is arranged to send multi-level phase holograms for display to the display engine. Each successive multi-level phase hologram corresponds to a different image. It may be said that each successive multi-level phase hologram comprises different image content. More specifically, the holographic reconstruction formable from each successive multi-level phase hologram is different. In other words, the sequence of multi-level phase holograms corresponds to a changing (e.g. moving) image/holographic reconstruction. The display engine is arranged to display each multi-level hologram of the sequence during a respective display interval, wherein the display intervals used to display the multi-level phase holograms of the sequence are immediately consecutive (such that each hologram is displayed without field inversion). That is, a continuous/uninterrupted group of display intervals are used to display the holograms of the sequence. The integer n may be an integer less than six. The integer n may be an integer less than the number of sub-frames per frame. In some embodiments, each multi-level phase hologram is displayed only once—that is, displaying during only one display interval. The holograms are therefore displayed, in order, without any regard to the polarity inversion.

The multi-level phase holograms are respectively displayed in immediately consecutive display intervals. In other words, the holograms are displayed, in order, one after the other in immediately adjacent display intervals. For the avoidance of doubt, only one hologram is displayed per display interval. For example, the first hologram in a sequence of holograms is displayed during a first display interval and the second hologram in the sequence is displayed during a second display interval, wherein the second display interval immediately follows the first display interval and so on. That is, there are no display intervals between display of sequential holograms. For example, there are no display intervals between the first display interval and the second display interval. The first display signal used to drive the pixels to display the first hologram has a first polarity and the second display signal used to drive the pixels to display the second holograms has a second polarity, wherein the second polarity is opposite to the first polarity. The first hologram is different to the second hologram—that is, the holographic reconstruction formed from the first hologram is different to the holographic reconstruction formed from the second hologram. In other words, the image content corresponding to the first hologram is different to the image content corresponding to the second hologram. The first hologram has been displayed without DC balancing using its own field inversion and the same is true of the second hologram. It may therefore be understood that each hologram is not field inverted. It may, however, be said that the first hologram is field inverted with respect to the second hologram.

It is well-understood in the liquid crystal community that field inversion is key to preserving the performance characteristics of a liquid crystal cell. It is commonplace to repeatedly reverse the polarity of the voltage applied to the liquid crystal cell. For example, the voltage between the common electrode and the pixel electrode may be positive in a first frame and negative in a second frame. The equal but opposite electric field in the two frames results in the same grey level but ensures that the molecules are DC balanced and do not "stick". In this example, the same image is displayed twice: once using a positive electric field and once using a negative electric field. The number of times the image is displayed using a positive field must be equal to the number of times the image is displayed using a negative field to achieve DC balancing. There is significant prejudice in the art to deviating from this rule.

The inventor has found that, during display of a sequence of holograms, the individual pixel value changes during display are essentially random. This is a consequence of the hologram calculation process that tends to evenly use the available grey levels. The inventor found by simulation that the grey level of each individual pixel during dynamic holographic projection of a video sequence of images was essentially white noise. The inventor confirmed by testing that the performance of a liquid crystal cell subjected to white noise for a long period of time did not deteriorate. Specifically, the adverse effects associated with a DC imbalance were not observed. The inventor recognised that a consequence of these phenomena is that the image content displayed using a liquid crystal device can be updated more frequently when formed from a computer-generated hologram because it is not necessary to field invert each hologram. A sequence of holograms may therefore be displayed using a drive scheme which would be consider imbalanced in conventional display. Specifically, a multi-level phase hologram does not need to be displayed using a positive electric field and a negative electric field. In summary, there is disclosed herein a method of displaying multi-level phase holograms on a liquid crystal display panel without DC balancing.

Each hologram may be displayed with only one positive drive signal or only one negative drive signal. It is possible to display a sequence of holograms during a corresponding sequence of display intervals without displaying any of the holograms more than once. This configuration is advantageous because it makes full use of the maximum refresh rate of the display device. This is achieved because each hologram is displayed only once and the successive holograms are displayed during successive display intervals.

The hologram engine may be arranged to calculate each hologram. The hologram may be a computer-generated hologram retrieved from memory containing a plurality of holograms or the hologram may be calculated from a target image during operation such as real-time processing of a video stream of images. The hologram may be computer-generated using an iterative phase retrieval algorithm which may be based on the Gerchberg-Saxton algorithm. The iterative process, including forward and reverse Fourier transforms, results in substantially even use of the available/allowable grey levels. The hologram calculation process may include at least one forward Fourier transform and at least one reverse Fourier transform. The number of iterations of the algorithm may be greater than three. The hologram is therefore a phase hologram which means that each grey level comprises a phase delay value. The number of grey (e.g. phase) levels may be 2n, where n is an integer, optionally, greater than three.

Each pixel may be a Freedericks cell comprising nematic liquid crystal. In other words, each pixel may comprise nematic liquid crystal arranged to perform a Freedericksz transition in response to the drive signal. The liquid crystal molecules are arranged to transition from a planar state to a homeotropic state when a voltage is applied across the cell. The voltage may be positive or negative. The liquid crystal molecules respond to the positive or negative voltage in the same way. Hence, field inversion can be achieved by simply reversing the voltage. A number of ways of achieving this are known using the common electrode voltage, VCOM. The drive signal comprises a voltage difference for each pixel, wherein the voltage difference is the respective pixel electrode voltage subtract the common electrode voltage. If the drive signal is positive, each voltage difference is positive. If the drive voltage is negative, each voltage difference is negative.

There is also disclosed herein a method of driving a display device. The display device comprises a liquid crystal panel, a display engine and a hologram engine. The liquid crystal display panel comprising a plurality of pixels. The display device comprises a display engine arrange to drive each pixel of the plurality of pixels during each display interval of a plurality of display intervals defined by the display device. Each pixel is driven in accordance with a drive signal. The drive signal may comprise a pixel voltage for each pixel. The display engine is arranged to invert the polarity of the drive signal every display interval. The hologram engine is arranged to send multi-level phase holograms for display to the display engine. The method comprises displaying the multi-level phase holograms in immediately consecutive display intervals without individual field inversion of each hologram.

There is further disclosed a method of projecting a reconstruction of an image. The method comprises a first step of calculating a multi-level phase hologram corresponding to the image. The method of driving a display device as per the preceding paragraph and illuminating each multi-level phase hologram during the corresponding display interval such that a holographic reconstruction of each image is formed on a replay plane spatially separated from the display device. The multi-level phase hologram may be calculated using an iterative phase retrieval algorithm.

There is disclosed herein a display device comprising a liquid crystal display panel, a display engine and a hologram engine. The liquid crystal display panel comprises a plurality of pixels. The display engine is arranged to drive each pixel of the plurality of pixels during each display event of a plurality of display events. The plurality of display events is defined by the display engine. Each pixel is driven in accordance with a drive signal. The display engine is arranged to periodically invert the polarity of the drive signal. The hologram engine is arranged to send holograms for display to the display engine. The display engine is configured such that each hologram is displayed using an unequal number of positive and negative drive signals. That is, the number of times the hologram is displayed using a positive drive signal is not equal to the number of times the hologram is displayed using a negative drive signal. The number of times the hologram is displayed using a positive drive signal or the number of times the hologram is displayed using a negative drive signal may be zero but the hologram must be displayed at least once. Each hologram may be displayed an uneven number of times.

The term "display interval" is used herein to refer to the shortest time window in which the pixels of the display device may be refreshed. The refresh rate of a liquid crystal display device may be greater than the frame rate needed to display video. Each liquid crystal pixel of the display device may therefore be driven multiple times during display of the same image frame. Each image frame of a sequence of image frames making up a video may therefore be divided into a plurality of sub-frames. In the context of video rate display, the term "display interval" therefore refers to the duration of a sub-frame.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIGS. 8A, 8B, 8C and 8D show drive schemes in accordance with embodiments.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
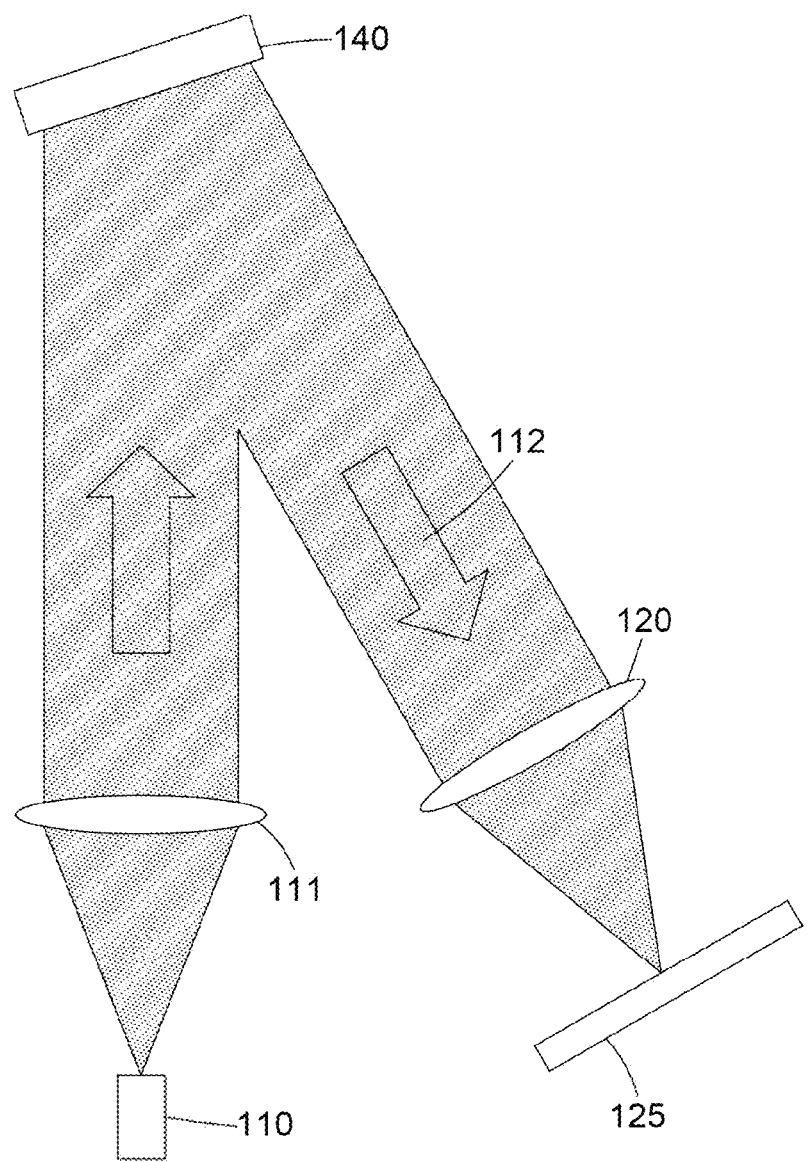
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$, and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information ψ[u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
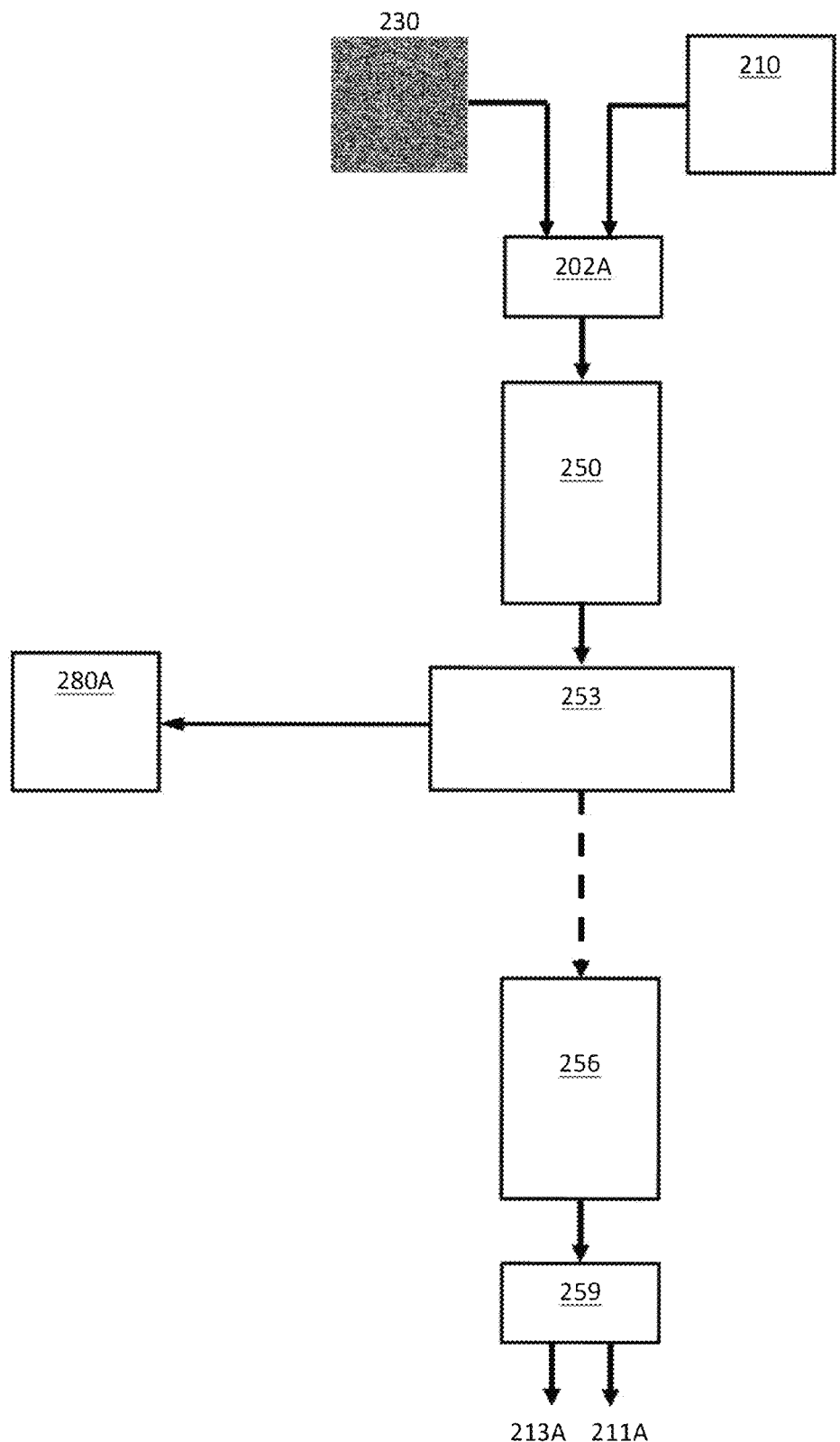
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
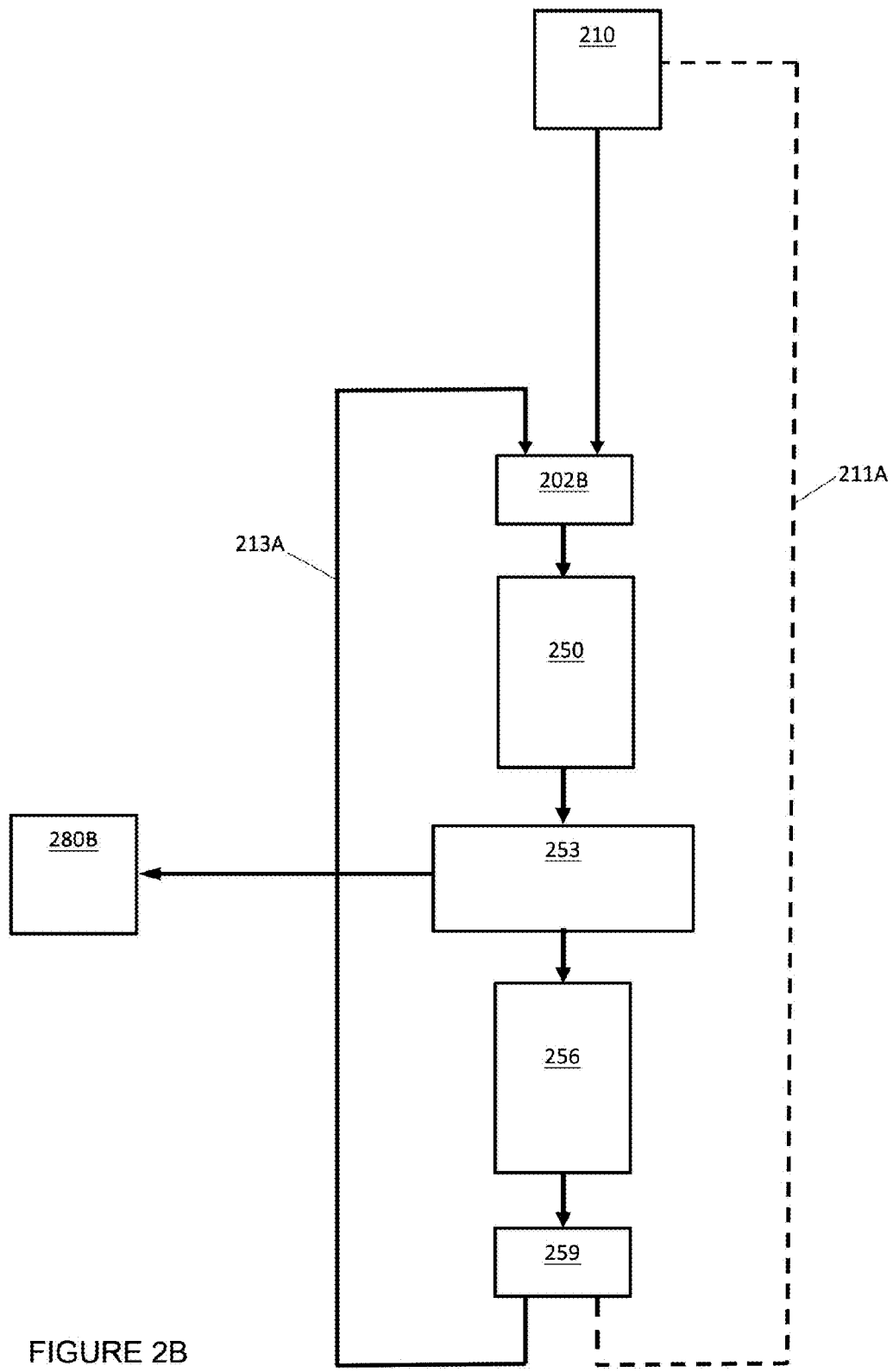
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
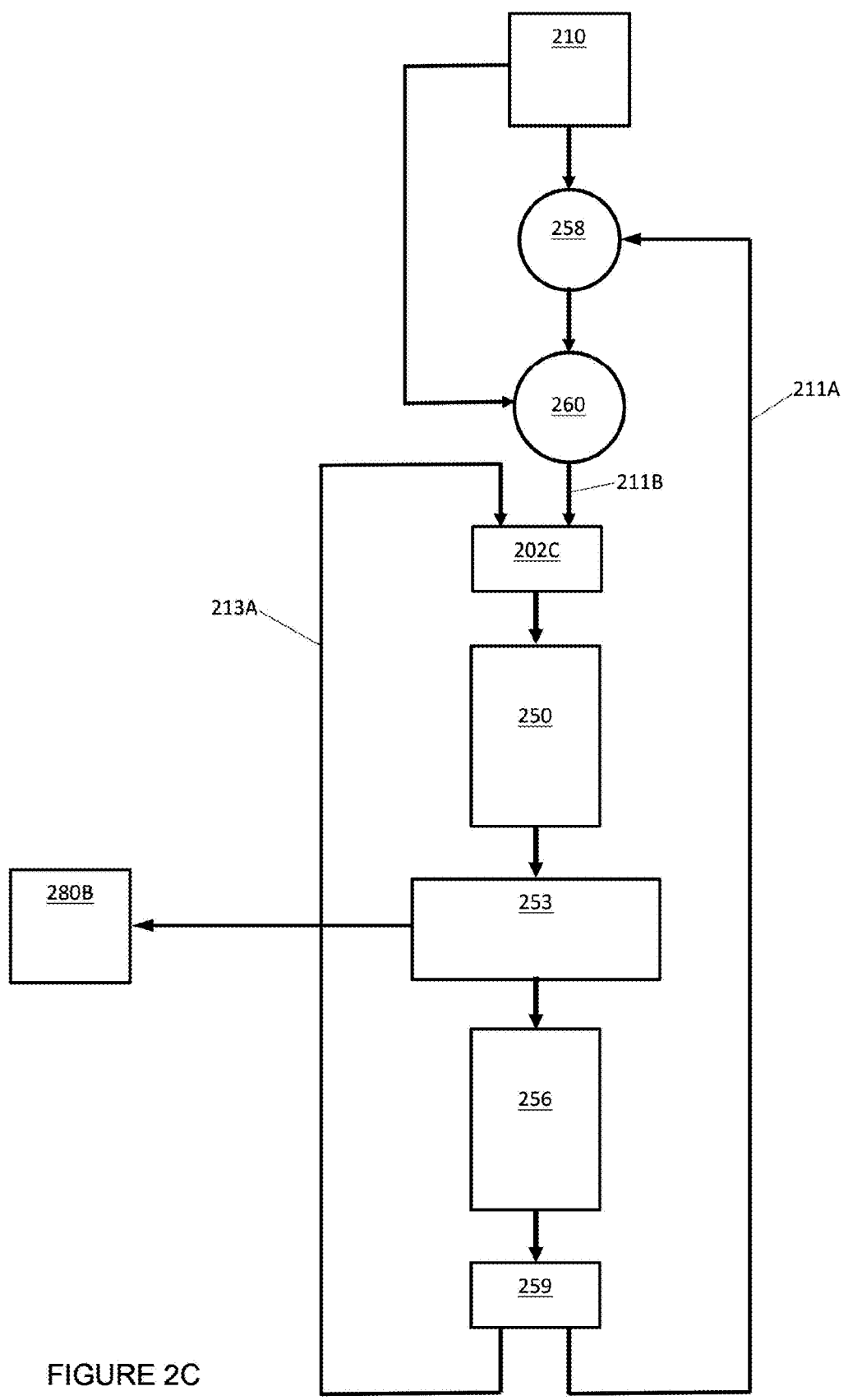
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
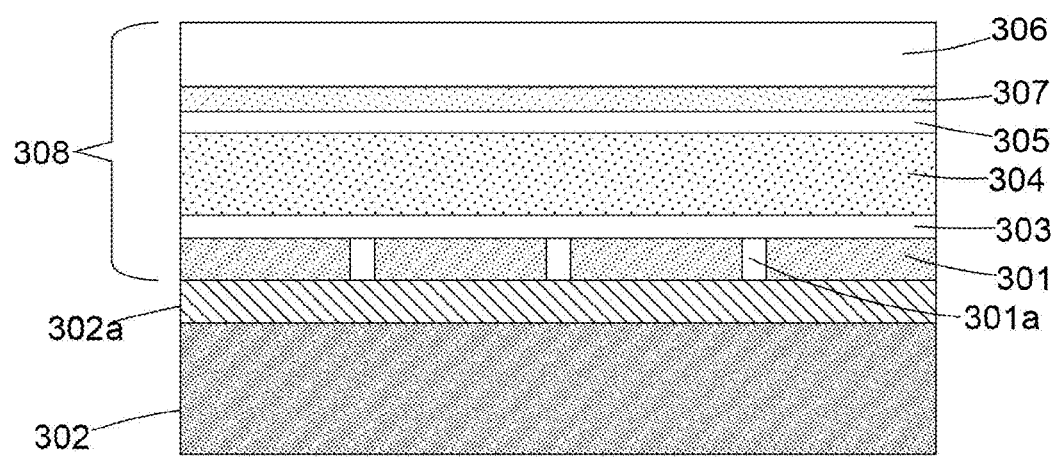
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Liquid Crystal Drive Scheme for Conventional Image Formation

Figure 4:
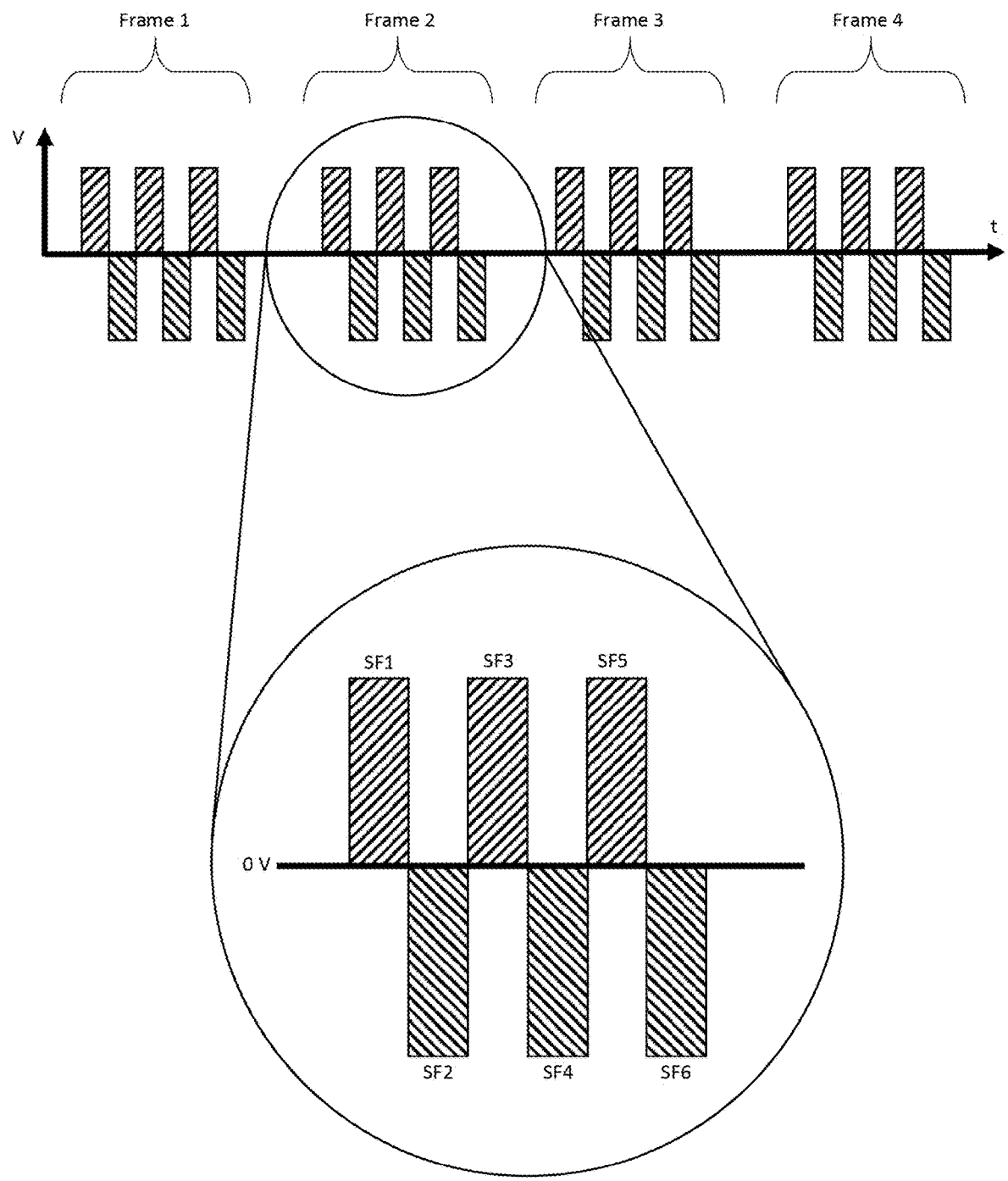
FIG. 4 illustrates field inversion.

FIG. 4 illustrates a scheme for driving the pixel array of a liquid crystal display device in order to help explain the process of DC balancing. The x-axis is time and the y-axis is the potential difference across the liquid crystal—that is, the potential difference between the common electrode and pixel electrode. The potential difference may be positive (represented herein by voltages above the x-axis) or negative (represented herein by voltages below the x-axis). There are shown four frames, wherein each frame comprises six sub-frames. Each frame corresponds to one image of a sequence of images for projection. The sequence of images may be a video rate sequence of images forming a moving image. Each hatched rectangle of FIG. 4 represents a display event. Each display event comprises displaying an image on the pixels on the display device. Each display event therefore comprises applying an individual pixel voltage to each pixel of the display device. Each pixel voltage determines the local behaviour—e.g. orientation—of the liquid crystal. Since the liquid crystal is birefringent, each pixel voltage corresponds to a light modulation value such as a phase modulation value. A larger gap between frames than between sub-frames of the same frame is shown in FIG. 4 for illustration only. In practice, the time gap between sub-frames may be even.

In this example, each frame comprises six display events—i.e. six sub-frames. Each sub-frame of a frame corresponds to the same image for projection. In effect, the same image is displayed six times within a frame interval. It may be said that the pixels of the display device are refreshed five times per frame to form a total of six display events per image (or per frame). It will be noted that the polarity of the potential difference is alternating within each frame. In this example, each frame comprises three display events using a positive potential difference interleaved with three display events using a negative potential difference. The concept of using either a positive potential difference or a negative potential difference to display each image is described further below with reference to FIG. 5. For the avoidance of doubt, the polarity of the potential difference applied across each pixel of the pixel array during a sub-frame is the same. That is, during a sub-frame, all pixels are either subjected to a positive potential difference or all pixels are subjected to a negative potential difference. The words positive and negative are principally used herein to reflect the direction of the potential difference is reversed. It is not essential that the polarity of the potential difference—and therefore the electric field—is continually reversed. For example, each frame may comprise three positive field display events in succession followed by three negative field display events in succession. The key principle accepted in the technical field is that the number of positive field display events in each frame must be equal to the number of negative field display events in each frame—regardless of the order of the positive and negative field display events in the frame. This ensures so-called DC balancing and prevents the liquid crystals from sticking.

Figure 5A:
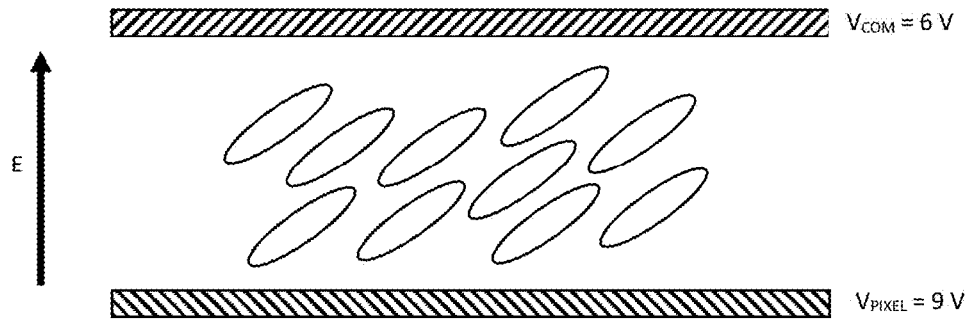
FIGS. 5A, 5B and 5C show a liquid crystal cell and an applied electric field.
Figure 5B:
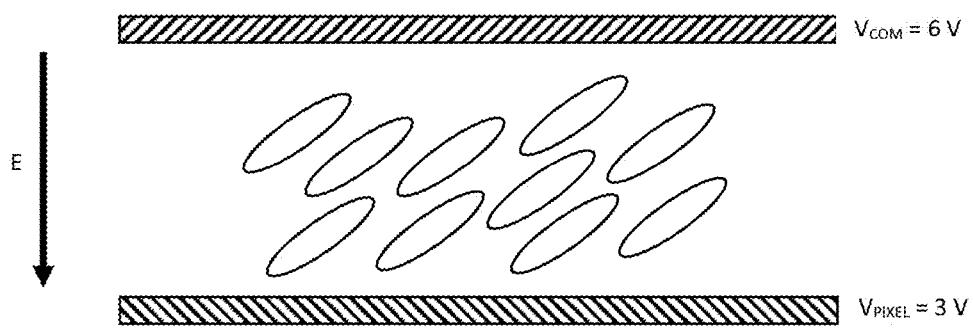

Each image can be displayed using a positive electric field or a negative electric field. Image pixel values (e.g. light modulation values) are converted to pixel voltages in accordance with a calibration. Each light modulation value may be achieved by applying a positive voltage or negative voltage to a pixel. In other words, a particular liquid crystal orientation (i.e. light modulation value) may be achieved using a positive field (FIG. 5A) or a negative field (FIG. 5B). FIGS. 5A and 5B show the common electrode voltage, VCOM, and pixel electrode voltage, $V_{PIXEL}$. The direction of the potential difference between the common electrode and pixel electrode determines the direction of the electric field across the liquid crystal as represented by the arrow labelled E. The liquid crystal director responds to the electric field but it is the magnitude of the electric field determines the orientation of the liquid crystal director, not the polarity.

Figure 5C:
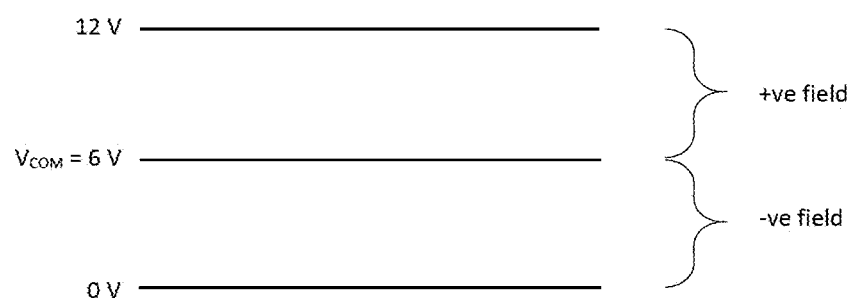

FIG. 5C shows a common electrode voltage of 6V. If pixel voltages between 6V and 12V are used to represent the image, a positive field is induced in the liquid crystal. If pixel voltages between 0V and 6V are used to represent the image, a negative field is induced in the liquid crystal. FIG. 5 illustrate how the same light modulation level may be achieved using a positive electric field or a negative electric field. Any number of techniques are known in the art for manipulating the pixel voltages and/or common voltage in order to provide positive and negative field display events—some of these methods involve using a fixed $V_{COM}$ (as per FIGS. 5A and 5B in which $V_{COM}$ is 6V in the positive field case and the negative field case) and other methods involve using a variable $V_{COM}$. The method chosen to provide complimentary positive fields and negative fields is not important in the context of the present disclosure.

The present disclosure relates to a drive scheme for holographic projection that deviates from well-established principles for conventional image formation based on the essential process of DC balancing.

Liquid Crystal Drive Scheme for Holographic Projection

In embodiments, holograms are displayed on the liquid crystal display device rather than images. Each hologram corresponds to an image. Each hologram may be calculated from a corresponding image using the method described above. In embodiments, each hologram is a multi-level hologram. Each hologram pixel voltage corresponds to a light modulation value. In some embodiments, the light modulation values are phase modulation values between 0 and $2\pi$ and each hologram comprises a distribution of phase-delay values, wherein each phase-delay value of the array is represented on each pixel of the pixel array.

The inventor has found that, during display of a sequence of holograms, the individual pixel value changes during display are essentially random. This is a consequence of the hologram calculation process that tends to evenly use the available grey levels.

Figure 6:
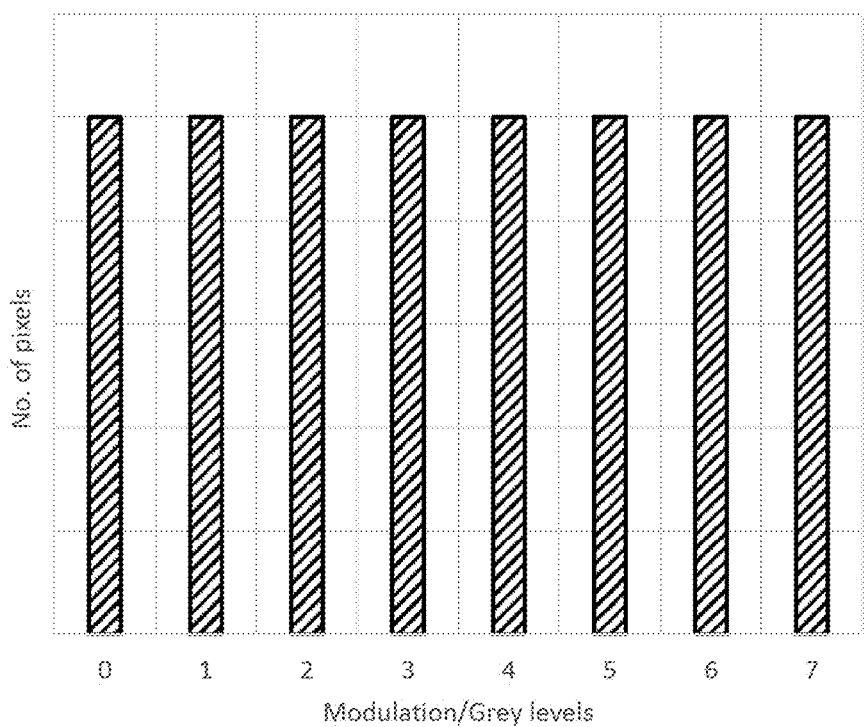
FIG. 6 is a histogram of grey levels resulting from hologram calculation using an iterative phase retrieval algorithm.

FIG. 6 shows the results of hologram calculation using an iterative phase retrieval algorithm. FIG. 6 has been obtained by counting to the number of occurrences of each grey level on the pixel array. It was found that the use of grey levels is substantially even. In other words, the number of pixels using each grey level is substantially uniform.

The inventor found by simulation that the grey level of each individual pixel during dynamic holographic projection of a video sequence of images resembles white noise. The inventor confirmed by testing that the performance of a liquid crystal cell subjected to white noise for a long period of time does not deteriorate, as explained further below. Specifically, the adverse effects associated with a DC imbalance are not observed.

Figure 7:
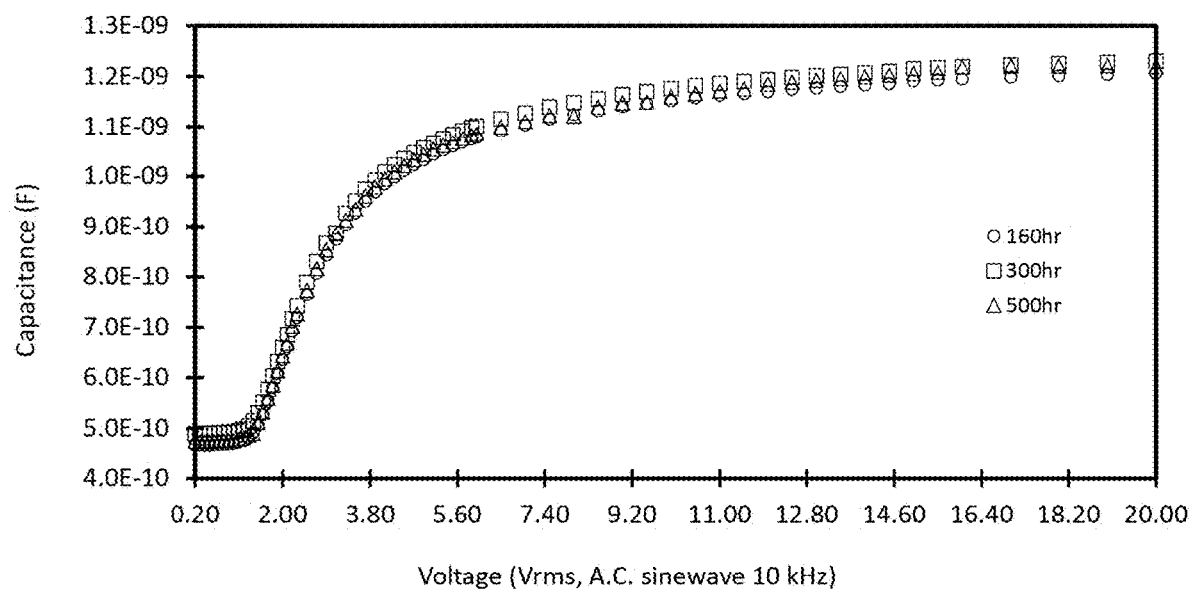
FIG. 7 shows the capacitance of a liquid crystal in accordance with embodiments.

The stability of a nematic liquid crystal mixture subjected to white noise was observed. Liquid crystal was capillary filled in a standard ITO glass test cell (10 ⌀ m thick with a pretilt of 5o) and connected to white noise signal 480 Hz, 5 VRMS using a waveform generator for 3 weeks (500 hrs). The uniformity of the output waveform was monitored using an oscilloscope and the applied voltage was monitored using a digital voltmeter. The voltages herein are root mean square values. Dielectric data was determined by measuring the capacitance using an impedance/gain phase analyser. Measuring the capacitance using the electric field induced Freedericksz transition is a standard method. It was found that the capacitance of the liquid crystal only changed slightly (less than 3%) during exposure to noise signal, as shown in FIG. 7. Because the capacitance remained stable, it can be concluded that driving a liquid crystal cell with white noise does not cause the liquid crystal to stick.

The inventor recognised that a consequence of these phenomena is that the image content displayed using a liquid crystal device can be updated more frequently when formed from a computer-generated hologram because it is not necessary to field invert each hologram. A sequence of holograms may therefore be displayed using a drive scheme which would be consider imbalanced in conventional display. Specifically, a multi-level phase hologram does not need to be displayed using a positive electric field and a negative electric field.

In accordance with these breakthroughs, FIG. 8 represent embodiments for displaying holograms. In some embodiments, the number of positive field display events per frame is unequal to the number of negative field display events per frame. FIG. 8A shows a first embodiment in which all hologram display events use a positive field. FIG. 8B shows a second embodiment in which all hologram display events use a negative field. FIG. 8C shows a third embodiment in which the first, second, fifth and sixth hologram display events use a positive field and the third and fourth hologram display events use a negative field. FIG. 8D shows a fourth embodiment in which the first and fifth hologram display events use a positive field and the second, third, fourth and sixth hologram display events use a negative field. The present disclosure is not limited to the unbalanced liquid crystal display schemes shown in FIG. 7 and instead extends to any combination of positive field display events and negative field display events providing the number of positive field display events (per source image) is not equal to the number of negative field display events.

In some embodiments—such as those shown in FIG. 8—each frame is unbalanced. That is, the liquid crystal drive scheme is unbalanced at the frame level. In other embodiments, at least some of the individual frames are balanced but the overall scheme is unbalanced. That is, over the duration of n frames, wherein n is an integer greater than one, there are more positive field display events than negative field display events. In these embodiments, it may be said that the liquid crystal drive scheme is unbalanced at the macro-level.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. The technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram). The term "tiling scheme" is used herein to refer to a particular arrangement of whole tile/s and part tile/s.

In some embodiments, the tiling scheme may change during a frame or between frames. For example, a first hologram display event of a frame may use a first tiling scheme and a second hologram display event of the frame may use a second tiling scheme different to the first tiling scheme. In some embodiments, all hologram display events of a first frame use a first tiling scheme and all hologram display events of a second frame use a second tiling scheme different to the first tiling scheme.

The drive scheme in accordance with the present disclosure allows for more different display events. Specifically, because each display event does not necessitate an equal and opposite display event, the examples of FIG. 8 may use, for example, six different tiling schemes of the same base hologram per frame. This can improve image quality. Likewise, complex interlacing techniques may be incorporated using more different sub-frames. The present disclosure effectively doubles the rate at which the display content may be changed.

In some embodiments, each hologram (whether tiled or not) is displayed only once. That is, only one sub-frame is used to display each hologram. The next (different) hologram may therefore be displayed in the next sub-frame. Accordingly, the frame rate of the display system is increased because each hologram is not displayed a plurality of times in order to ensure DC balancing.

There is therefore disclosed herein a display device comprising a liquid crystal display panel, a display engine and a hologram engine. The liquid crystal display panel comprises a plurality of pixels. The display engine is arranged to drive each pixel of the plurality of pixels during each display event of a plurality of display events. The plurality of display events is defined by the display engine. Each pixel is driven in accordance with a drive signal. The display engine is arranged to periodically invert the polarity of the drive signal. The hologram engine is arranged to send holograms for display to the display engine. The display engine is configured such that each hologram is displayed using an unequal number of positive and negative drive signals. That is, the number of times the hologram is displayed using a positive drive signal is not equal to the number of times the hologram is displayed using a negative drive signal. The number of times the hologram is displayed using a positive drive signal or the number of times the hologram is displayed using a negative drive signal may be zero but the hologram must be displayed at least once. Each hologram may be displayed an uneven number of times.

Figure 9:
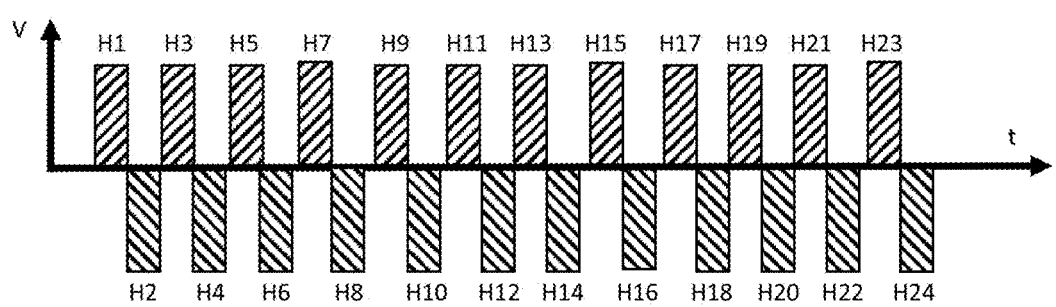
FIG. 9 shows a further drive scheme in accordance with embodiments.

Teachings of the present disclosure are compatible with liquid crystal display devices—including existing liquid crystal display devices—that are configured for field inversion. For example, the liquid crystal drive scheme shown in FIG. 4 is compatible with the present disclosure—even though it is designed for DC balancing. In some embodiments, the drive scheme of FIG. 4 is used to display a different hologram (that is, a hologram corresponding to a different source image) every sub-frame. In some embodiments, the liquid crystal device is used to display images (e.g. moving images) that are updating/changing more frequently (e.g. at least twice the frequency) because at least two sub-frames are not needed per source image frame. The frame rate of the source may therefore be higher than previously possible for holographic projection. In some embodiments, each hologram is not field inverted, or each hologram is displayed with uneven field inversion—e.g. more positive field display events than negative field display events. FIG. 9 shows an embodiment in which sequential holograms, H1-H24, are displayed in sequential sub-frames. For the avoidance of doubt, each hologram, H1-H24, corresponds to a different source image of a sequence of source images. Notably, each hologram is displayed only once—i.e. no field inversion. It can be seen from FIG. 9 that the maximum permissible display rate of the device is effectively increased. The display device of FIG. 4, for example, provides a plurality of discrete display intervals and sequential holograms are displayed in sequential display events—that is, without field inversion. In some embodiments, the teachings of the present disclosure are implemented using the drive scheme of FIG. 4, and it will be understood that any distinction between frames and sub-frames is effectively ignored.

There is therefore disclosed herein a display device comprising a liquid crystal display panel, a display engine and a hologram engine. The liquid crystal display panel comprises a plurality of pixels. The display engine is arranged to drive each pixel of the plurality of pixels during each display event of a plurality of display intervals. The plurality of display intervals is defined by the display engine. Each pixel is driven in accordance with a drive signal. The display engine is arranged to invert the polarity of the drive signal every n display intervals. The display driver may be arranged to invert the polarity of the drive signal every display interval. Alternatively, the display engine may be arranged to invert the polarity of the drive signal every second or every third display interval. The hologram engine is arranged to send multi-level phase holograms for display to the display engine. Each multi-level phase hologram corresponds to a different image. The display engine is arranged to display each multi-level hologram of the sequence during a respective display interval, wherein the display intervals used to display the multi-level phase holograms of the sequence are immediately consecutive. That is, a continuous/uninterrupted group of display intervals are used to display the holograms of the sequence. In some embodiments, n is an integer less than six. In some embodiments, n is an integer less than the number of sub-frames per frame.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising: a display device, the display device comprising: a liquid crystal spatial light modulator comprising a plurality of pixels; a display engine arranged to drive each pixel of the plurality of pixels, in accordance with a drive signal, during each display interval of a plurality of display intervals defined by the display engine; a hologram engine arranged to send a sequence of multi-level phase holograms for display to the display engine; and wherein the display engine is arranged to display on the liquid crystal spatial light modulator each multi-level phase hologram of the sequence in a different respective display interval, wherein the display intervals used to display the multi-level phase holograms of the sequence are immediately consecutive, wherein each successive multi-level phase hologram of the sequence of multi-level phase holograms corresponds to a different respective image, such that the holographic reconstruction formable from each successive multi-level phase hologram is different; wherein the display engine is arranged to invert polarity of the drive signal after every n display intervals, wherein n is an integer; such that polarity of the drive signal does not change during a time in which a respective individual holographic reconstruction is formable from the corresponding displayed multi-level phase hologram; and a light source arranged to illuminate each hologram on the liquid crystal spatial light modulator during the corresponding display interval such that a holographic reconstruction corresponding to each hologram is formed on a replay plane spatially separated from the display device.

2. A holographic projector as claimed in claim 1 wherein each hologram is displayed during only one display interval.

3. A holographic projector as claimed in claim 1 wherein the hologram engine is arranged to calculate each hologram using an iterative phase retrieval algorithm.

4. A holographic projector as claimed in claim 1 wherein each pixel is a Freedericksz cell comprising a nematic liquid crystal.

5. A head-up display comprising the holographic projector of any of claims 1-4.

6. A method of projecting a sequence of holographic reconstructions of a sequence of images, using a display device comprising: a liquid crystal spatial light modulator comprising a plurality of pixels; a display engine arranged to drive each pixel of the plurality of pixels, in accordance with a drive signal, during each display event of a plurality of display intervals defined by the display engine; and a hologram engine arranged to send multi-level phase holograms for display to the display engine, wherein the method comprises sending a sequence of multi-level phase holograms to the display engine, each multi-level phase hologram corresponding to an image of the sequence of images; displaying on the liquid crystal spatial light modulators each multi-level phase hologram of the sequence in a different respective display interval, wherein the display intervals used to display the multi-level phase holograms of the sequence are immediately consecutive; wherein each successive multi-level phase hologram of the sequence of multi-level phase holograms corresponds to a different respective image, such that the holographic reconstruction formable from each successive multi-level phase hologram is different; inverting polarity of the drive signal every n display intervals, wherein n is an integer; and illuminating each multi-level phase hologram during the corresponding display interval such that a holographic reconstruction of each image is formed on a replay plane spatially separated from the display device, such that polarity of the drive signal does not change during a time in which a respective individual holographic reconstruction is formable from the corresponding displayed multi-level phase hologram.

7. A method of projecting a reconstruction of an image as claimed in claim 6 wherein the step of calculating the multi-level phase hologram comprises using an iterative phase retrieval algorithm.

8. A method as claimed in claim 6, wherein n is greater than one.

9. A method as claimed in claim 6, wherein each hologram is a phase-only hologram.

10. A method as claimed in claim 6, wherein each hologram is a phase-and-amplitude-only hologram.

11. A method as claimed in claim 6, wherein each pixel is a Freedericksz cell comprising a nematic liquid crystal.

* * * * *